US012718240B2

(12) United States Patent
Dande et al.

(10) Patent No.: US 12,718,240 B2
(45) Date of Patent: Aug. 25, 2026

(54) SYSTEMS AND METHODS FOR PROVIDING REUSABLE OBJECTS IN A PROCESS FLOW VIA REFRESH TOKENS

(71) Applicant: BANK OF AMERICA CORPORATION, Charlotte, NC (US)

(72) Inventors: Pratap Dande, Saint Johns, FL (US); Naga Vamsi Krishna Akkapeddi, Charlotte, NC (US); Saurabh Arora, Gurugram (IN); Lester M. Killian, Mooresville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 19/051,940

(22) Filed: Feb. 12, 2025

(65) Prior Publication Data

US 2026/0236920 A1 Aug. 13, 2026

(51) Int. Cl.
*G06Q 20/40* (2012.01)
*G06Q 20/38* (2012.01)

(52) U.S. Cl.
CPC ......... *G06Q 20/401* (2013.01); *G06Q 20/382* (2013.01)

(58) Field of Classification Search
CPC .......................... G06Q 20/401; G06Q 20/382
See application file for complete search history.

(56) References Cited

U.S. PATENT DOCUMENTS

2012/0030094 A1* 2/2012 Khalil .................. G06Q 10/06 705/39
2016/0124742 A1* 5/2016 Rangasamy ........... H04L 41/20 717/103
2018/0198777 A1* 7/2018 Flamini ............... H04L 63/0807
2019/0171721 A1* 6/2019 Oukid ................ G06F 16/2308
2021/0117938 A1* 4/2021 Arora .................. G06Q 20/389
2021/0192534 A1* 6/2021 Lee ..................... G06Q 20/401
2024/0265067 A1* 8/2024 Dlhopolsky ....... G06Q 20/1235
2025/0053972 A1* 2/2025 Anton ................. G06Q 20/389
2025/0104022 A1* 3/2025 Shah ..................... G06Q 20/02
2026/0019262 A1* 1/2026 Cozma ................. H04L 9/3213

FOREIGN PATENT DOCUMENTS

CN 115456630 A * 12/2022 ............. G06F 17/10
CN 118297595 A * 7/2024 ......... G06F 16/2379
EP 3846032 A1 * 7/2021 ........... H04L 67/566
WO WO-2022248849 A1 * 12/2022 ......... G06Q 20/0655

* cited by examiner

*Primary Examiner* — Chunling Ding
(74) *Attorney, Agent, or Firm* — Moore & Van Allen PLLC; Vincent J. Dowling

(57) ABSTRACT

Systems, computer program products, and methods are described herein for providing reusable objects in a process flow via refresh tokens. Embodiments of the present disclosure are configured to receive, via a network interface, a transaction from a system of origin, input the transaction into a transaction process flow, where the transaction process flow includes N transaction steps, generate, at each transaction step of the N transaction steps, a plurality of objects, ingest, at each transaction step of the N transaction steps, the plurality of objects in a model, store, if the transaction reaches step N of the transaction process flow, a first subset of objects in one or more systems of record, where the first subset of objects includes objects from each plurality of objects, and apply one or more objects of the first subset of objects to an associated transaction.

20 Claims, 10 Drawing Sheets

ANALYZE EACH OBJECT OF A PLURALITY OF OBJECTS
502

ASSOCIATE EACH OBJECT OF THE PLURALITY OF OBJECTS WITH A SYSTEM OF RECORD OF ONE OR MORE SYSTEMS OF RECORD
504

IDENTIFY, FOR EACH OBJECT OF A PLURALITY OF OBJECTS, A CATEGORY WITH WHICH THE OBJECT IS ASSOCIATED
602

SEGREGATE EACH OBJECT OF THE PLURALITY OF OBJECTS, BASED ON IDENTIFIED CATEGORIES, INTO A USER SPECIFIC CATEGORY OR A TRANSACTION SPECIFIC CATEGORY
604

ASSIGN, FOR EACH OBJECT OF THE PLURALITY OF OBJECTS, A REFRESH TOKEN
606

IDENTIFY A SECOND SUBSET OF OBJECTS USED IN A PLURALITY OF TRANSACTIONS
702

SET A REFRESH STATE OF A REFRESH TOKEN ASSIGNED TO AN OBJECT OF THE SECOND SUBSET OF OBJECTS TO REUSE
704

QUERY A MODEL TO SEARCH ONE OR MORE SYSTEMS OF RECORDS FOR AN OBJECT
802

RETRIEVE, IF THE MODEL DETECTS THE OBJECT IS STORED IN A SYSTEM OF RECORD OF THE ONE OR MORE SYSTEMS OF RECORD, THE OBJECT
804

SYSTEMS AND METHODS FOR PROVIDING REUSABLE OBJECTS IN A PROCESS FLOW VIA REFRESH TOKENS

FIELD OF THE INVENTION

The present invention embraces a system for providing reusable objects in a process flow via refresh tokens.

BACKGROUND

Presently, a transaction may be cancelled as the transaction is being transmitted or processed. These cancellations may occur while the transaction is at different transaction steps, at the transaction source, or at the intended destination. Although the transaction technically reaches the end-of-life cycle if it is cancelled, the transaction still generates objects that stick to the transaction. There is a need for systems and methods to identify these sticky objects associated with a transaction and reuse them in subsequent transactions.

Applicant has identified a number of deficiencies and problems associated with objects generated as a transaction is being processed. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for providing reusable objects in a process flow via refresh tokens may include a network interface configured to communicate via a communication network, at least one non-transitory storage device including computer program code stored thereon, and at least one processing device operably coupled to the network interface, and the at least one non-transitory storage device, where the computer program code may include computer instructions. In some embodiments, the computer program code may include computer instructions configured to cause the processing device to receive, via the network interface, a transaction from a system of origin, input the transaction into a transaction process flow, where the transaction process flow may include N transaction steps, generate, at each transaction step of the N transaction steps, a plurality of objects, ingest, at each transaction step of the N transaction steps, the plurality of objects in a model, store, if the transaction reaches step N of the transaction process flow, a first subset of objects in one or more systems of record, where the first subset of objects may include objects from each plurality of objects, and apply one or more objects of the first subset of objects to an associated transaction.

In some embodiments, the at least one non-transitory storage device may include computer-executable program code that, when executed by the at least one processing device, causes the model to, after ingesting the plurality of objects at a transaction step, analyze each object of the plurality of objects and associate each object of the plurality of objects with a system of record of the one or more systems of record. Additionally, or alternatively, the at least one non-transitory storage device may include computer-executable program code that, when executed by the at least one processing device, causes the model to, after ingesting the plurality of objects at a transaction step, identify, for each object of the plurality of objects, a category with which the object is associated, segregate each object of the plurality of objects, based on identified categories, into a user specific category or a transaction specific category, and assign, for each object of the plurality of objects, a refresh token.

In some embodiments, the model may be configured to track, via the transaction process flow, a life cycle of the transaction, the N transaction steps involved in the transaction, and a user account associated with the transaction. Additionally, or alternatively, the refresh token may be configured to be reusable for other transactions associated with the transaction, and/or the refresh token may include a refresh state, a current owner of the refresh token, and a history table of owners of the refresh token. Further, the at least one non-transitory storage device may include computer-executable program code that, when executed by the at least one processing device, causes the model to identify a second subset of objects used in a plurality of transactions and set a refresh state of a refresh token assigned to an object of the second subset of objects to reuse.

In some embodiments, a refresh token assigned to an object of the first subset of objects may have a refresh state of no reuse. Additionally, or alternatively, if the transaction fails to reach step N of the transaction process flow, each refresh token assigned to each object of each plurality of objects may have a refresh state of reuse.

In some embodiments, one or more objects of at least one plurality of objects may be associated with infrastructure components used in the transaction process flow. Additionally, or alternatively, the at least one non-transitory storage device may include computer-executable program code that, when executed by the at least one processing device, causes the at least one processing device to, prior to generating an object of the plurality of objects at each transaction step, query the model to search the one or more systems of records for the object and retrieve, if the model detects the object is stored in a system of record of the one or more systems of record, the object.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
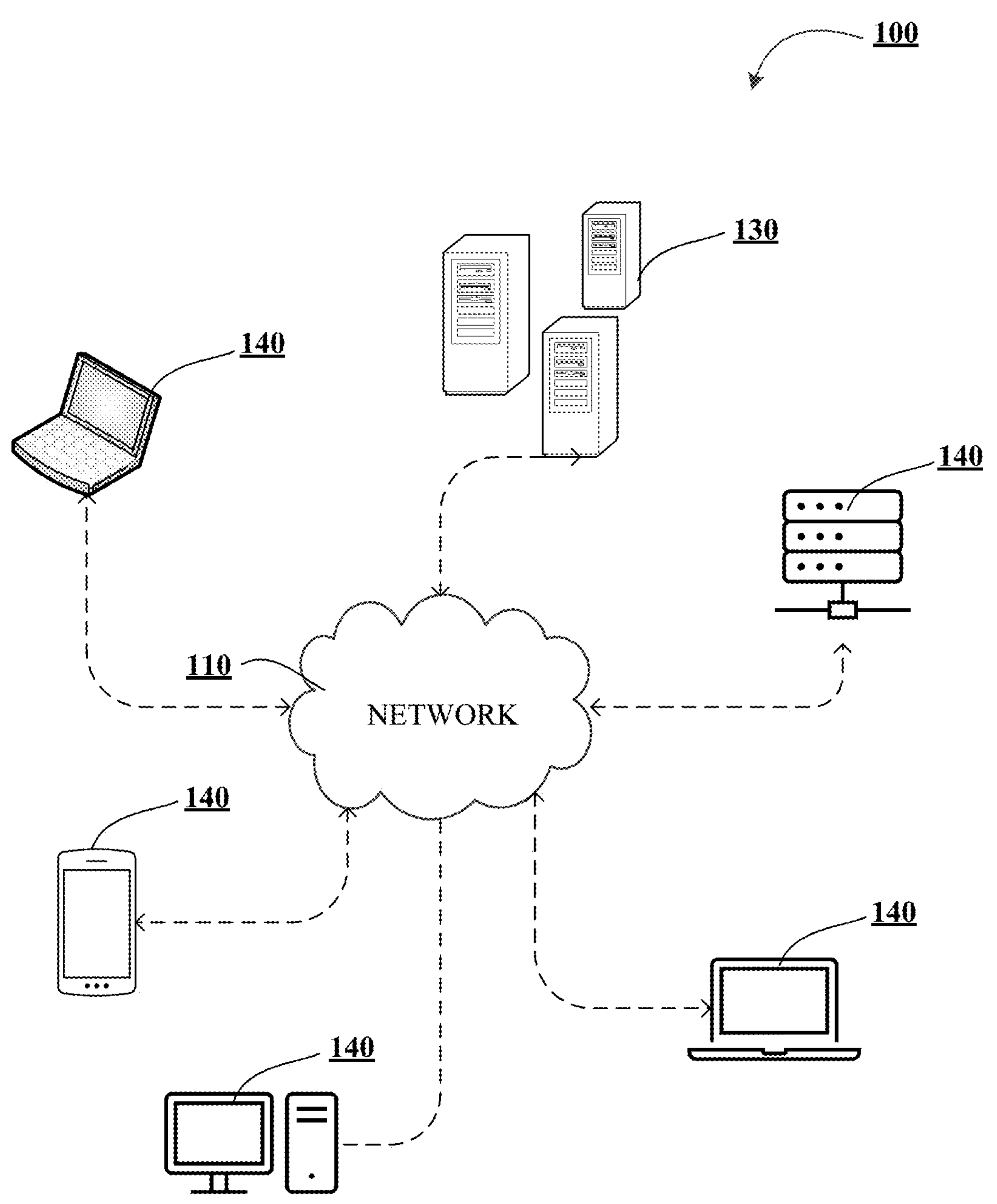
Figure 1B:
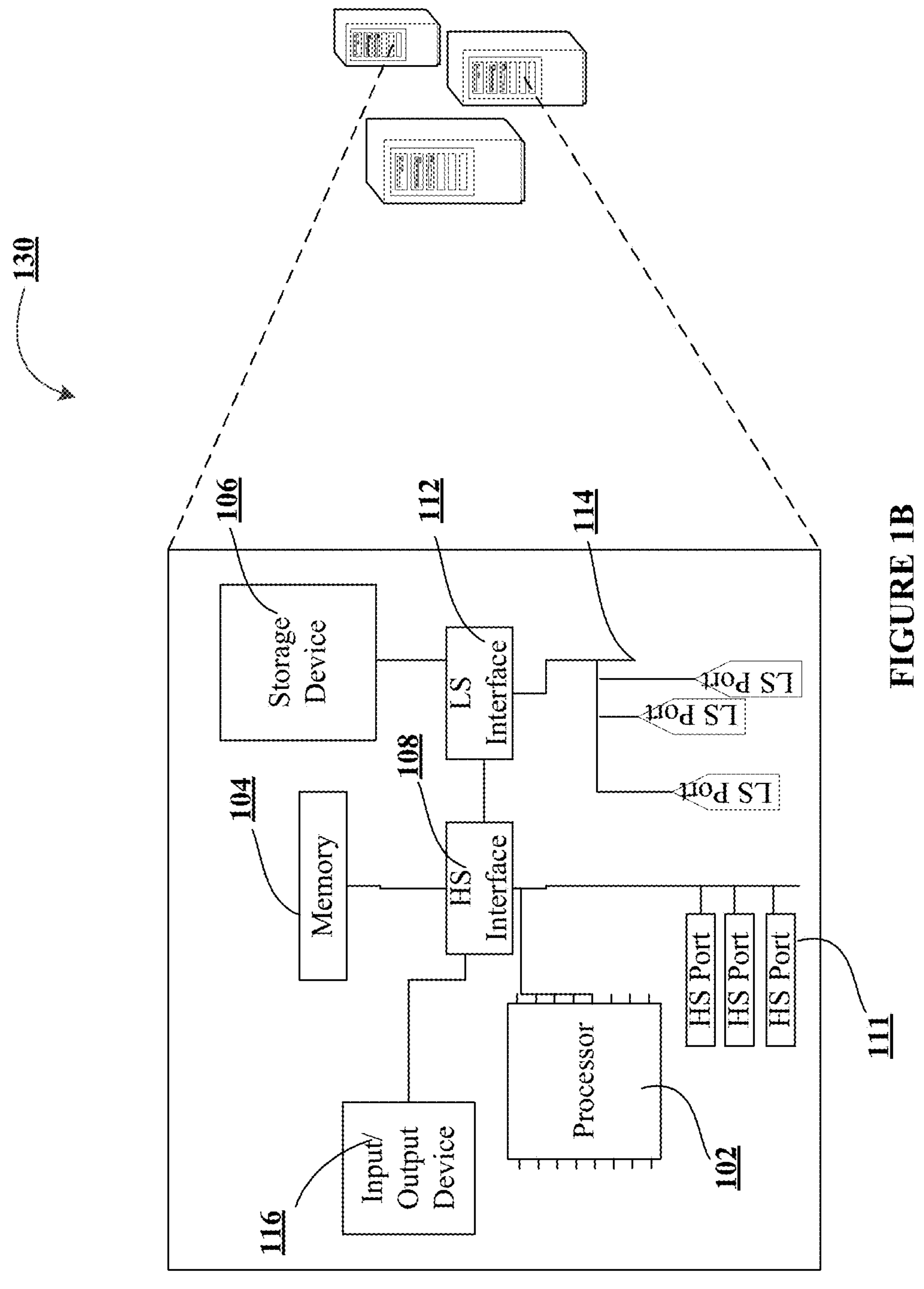
Figure 1C:
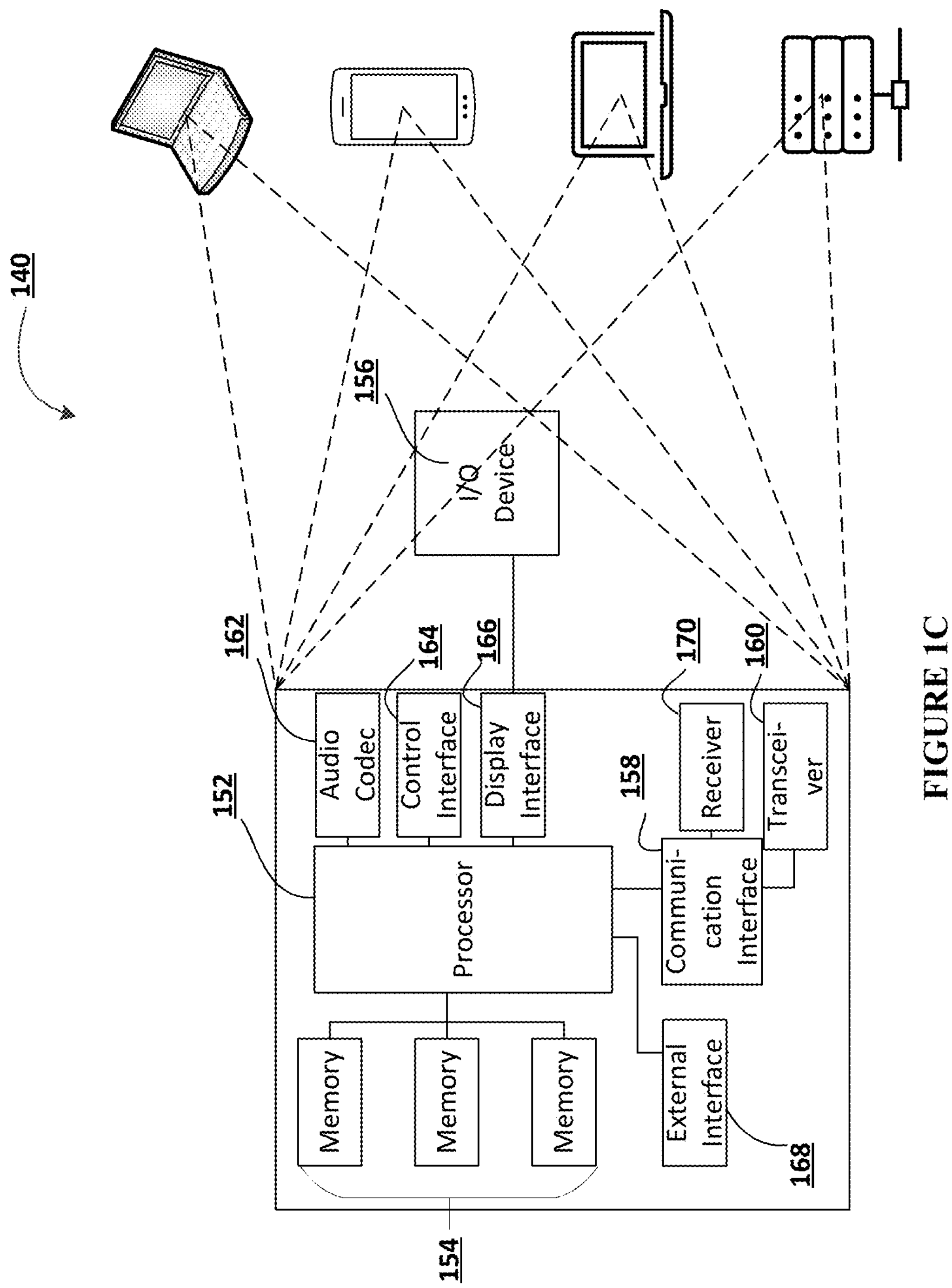
Figure 2:
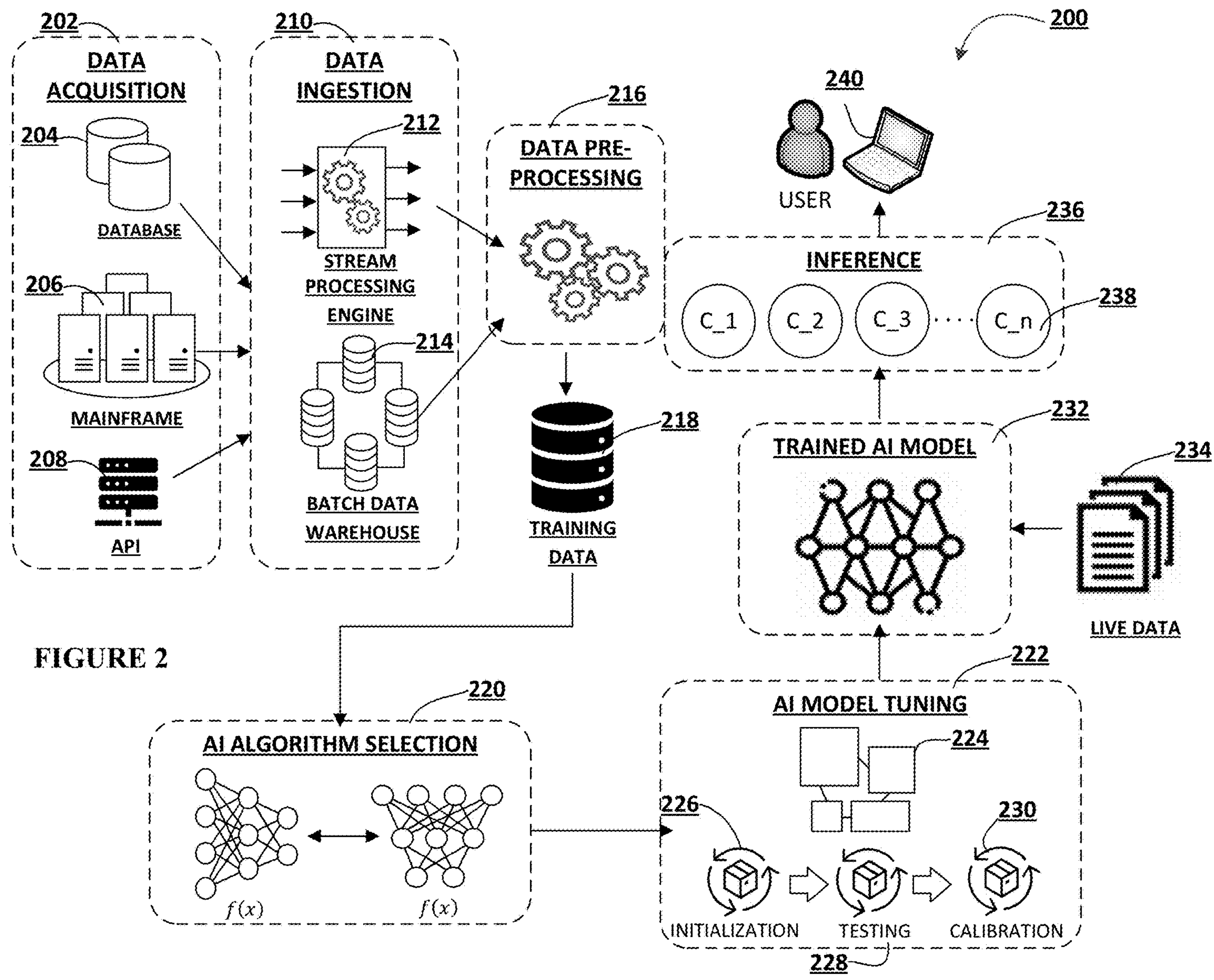
Figure 3:
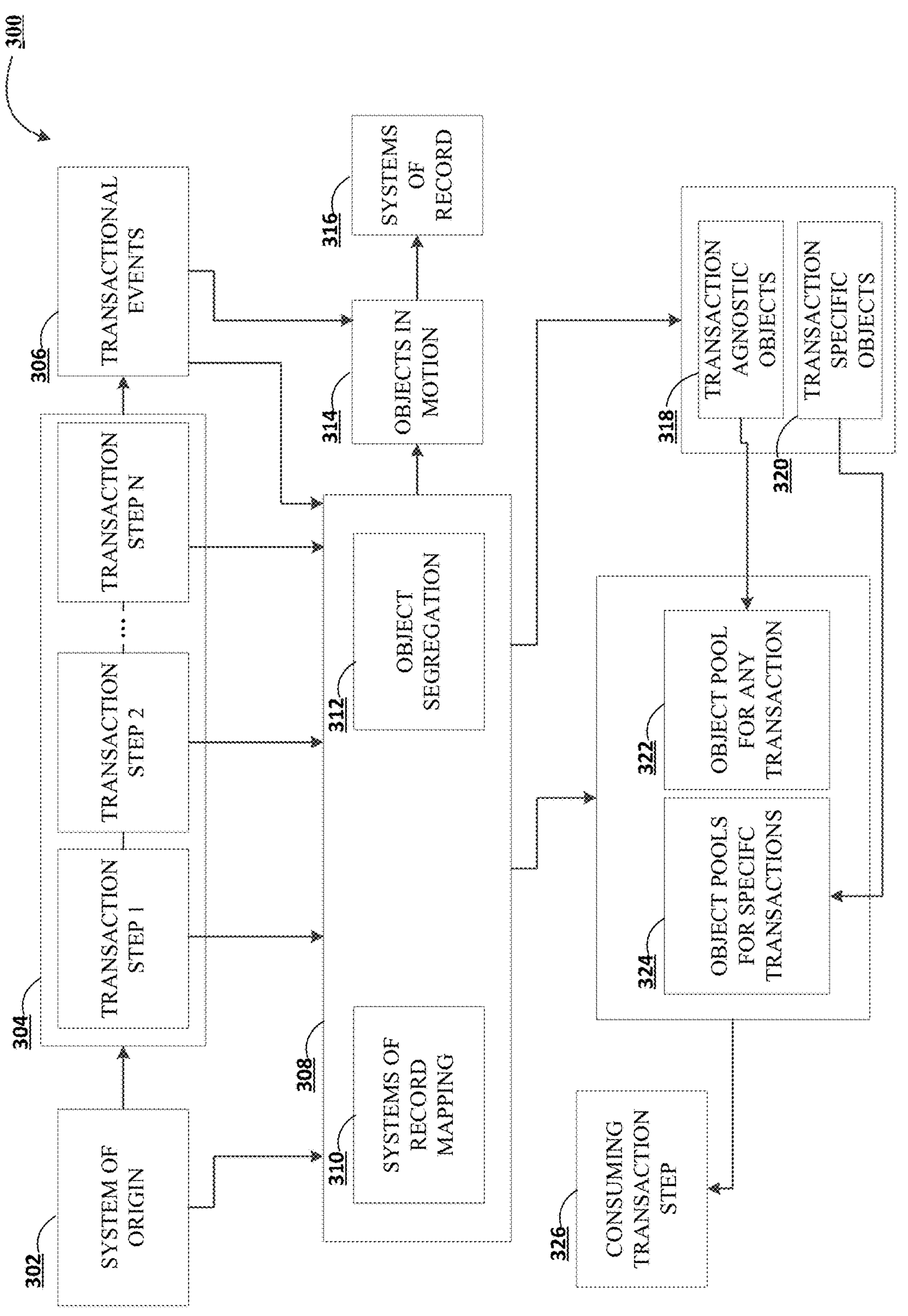
Figure 4:
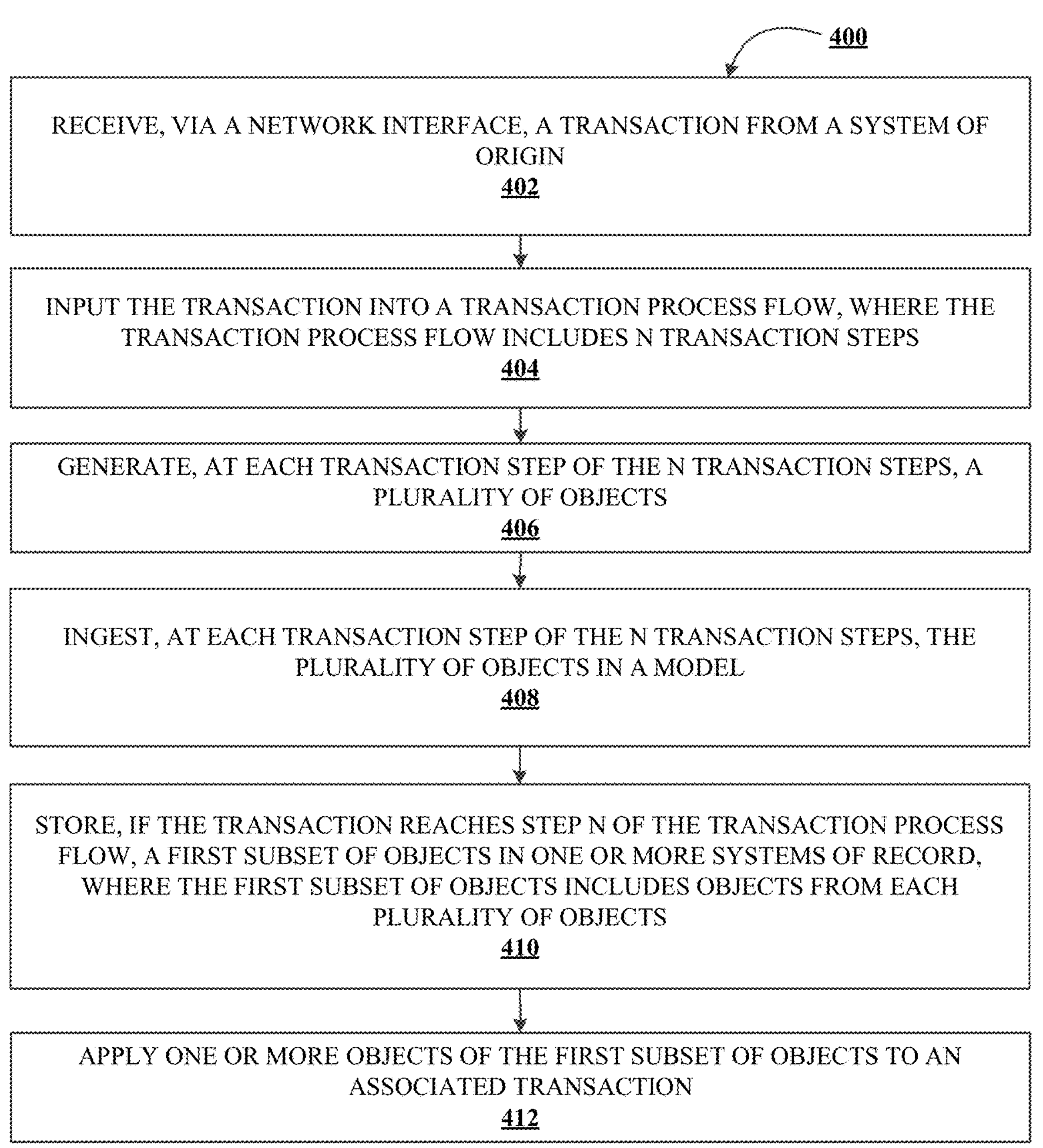
Figure 5:
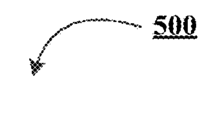
Figure 6:
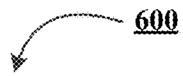
Figure 7:
Figure 8:

Having thus described embodiments of the invention in general terms, reference will now be made the accompanying drawings, wherein:

FIGS. 1A-1C illustrates technical components of an exemplary distributed computing environment for providing reusable objects in a process flow via refresh tokens, in accordance with an embodiment of the disclosure;

FIG. 2 illustrates an exemplary artificial intelligence (AI) engine subsystem architecture, in accordance with an embodiment of the disclosure;

FIG. 3 illustrates a flowchart for providing reusable objects in a process flow via refresh tokens, in accordance with an embodiment of the disclosure;

FIG. 4 illustrates a process flow for providing reusable objects in a process flow via refresh tokens, in accordance with an embodiment of the disclosure;

FIG. 5 illustrates another process flow for providing reusable objects in a process flow via refresh tokens, in accordance with an embodiment of the disclosure;

FIG. 6 illustrates another process flow for providing reusable objects in a process flow via refresh tokens, in accordance with an embodiment of the disclosure;

FIG. 7 illustrates another process flow for providing reusable objects in a process flow via refresh tokens, in accordance with an embodiment of the disclosure; and FIG. 8 illustrates another process flow for providing reusable objects in a process flow via refresh tokens, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, and/or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning of, for example, distal phalanges, intermediate phalanges, proximal phalanges, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, and/or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, and/or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and/or the like.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities, and/or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer", a "transaction", a "transaction event", or a "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and/or the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The present disclosure may include a system, computer program, and/or method for providing reusable objects in a process flow via refresh tokens. Presently, a transaction may be cancelled as the transaction is being transmitted or processed. These cancellations may occur while the transaction is at different transaction steps, at the transaction source, or at the intended destination. Although the transaction technically reaches the end-of-life cycle if it is cancelled, the transaction still generates objects that stick to the transaction. There is a need for systems and methods to identify these sticky objects associated with a transaction and reuse them in subsequent transactions.

Accordingly, the invention may include a system, computer program, and method for providing reusable objects in a process flow via refresh tokens. Embodiments of the present disclosure may be configured to receive a transaction from a system of origin (e.g., the system or platform where the transaction was initiated), input the transaction into a transaction process flow (e.g., a transaction pathway with one or more applications required to complete the transaction), where the transaction process flow includes N transaction steps (e.g., the amount of applications in the transaction pathway), generate, at each transaction step of the N transaction steps, a plurality of objects (e.g., data, images, documents, and/or the like), ingest, at each transaction step of the N transaction steps, the plurality of objects in a model (e.g., an AI or any type of model or models configured to map objects to different systems of record and segregate objects into different categories). Further, embodiments of the present disclosure may store, if the transaction reaches step N of the transaction process flow (e.g., the transaction is successfully completed), a first subset of objects (e.g., objects determined by the model to not currently be necessary for incoming transactions) in one or more systems of record, where the first subset of objects may include objects from each plurality of objects, and apply one or more objects of the first subset of objects to an associated transaction (e.g., a future transaction that has one or more similarities to the transaction). In some embodiments, the model may be further configured to assign, for each generated object, a refresh token, where the refresh token may be set to a refresh state of reuse or no reuse (e.g., if the model determines the object will be useful in future transactions).

For example, a transaction associated with a vendor creation on an application may generate objects including payment data, entity owned images related to the vendor, contract documents, and/or the like. These objects may be created in a system of record and may be distributed to various other applications. Additionally, based on the generated objects, a further set of objects (e.g., general ledger (GL) account, cost center, expense type combination, and/or the like) may be generated at a transaction processing system. In such embodiments, when a vendor-related transaction (e.g., an invoice) is received, the generated objects may be used in validating and/or processing the vendor-related transaction. In some embodiments, an application may include a plurality of infrastructure components (e.g., RAM, an application server, a load balancer, a caching server, a file system, and/or the like). When an application including a plurality of infrastructure components is being discontinued, the plurality of infrastructure components may require a long period of time to be de-allocated.

In some embodiments of the present disclosure, a transaction may be initiated at a system of origin, and each transaction step (e.g., system of origin, applications, transaction process applications, and/or the like) in a transaction process flow may send an event with generated objects for a transaction. In such embodiments, a database (e.g., a central operational object store) may include a model (e.g., a python-based model, an AI-based model, any software-based model, and/or the like) that maintains a mapping for generated objects with their respective systems of record. Additionally, or alternatively, the model may categorize the generated objects based on one or more categories (e.g., an application user account, a transaction type, a life cycle of a transaction, and/or the like) and/or segregate the generated objects (e.g., as a user specific object or a transaction specific object). Further, the model may track the lifecycle of transactions within the transaction process flow, applications involved in the transaction process flow, and/or user accounts associated with the transaction.

In some embodiments, each generated object may be assigned a refresh token (e.g., a custom reusable refresh token assigned by using open source such as Java, C#, and/or the like and/or assigned by the model). In such embodiments, for transactions that are successfully processed, respective objects may be passed and may be stored in respective systems of record permanently and the model may update the assigned refresh tokens with no re-use. Additionally, or alternatively, objects of the transaction that are unused may be categorized into an account and/or transaction specific category or an account and/or transaction agnostic category such that these objects are pooled separately. Further, for a subsequent transaction, when a system of origin creates the subsequent transaction, the model may be checked to see if a new object should be generated or if an existing object may be reused. In embodiments where a re-usable object is available, the model may assign the object and may update the associated refresh token as no refresh temporarily. Additionally, or alternatively, a subset of objects (e.g., objects determined by the model to be consistently used in transactions) of a transaction that is successfully processed may be pooled for reuse. The aforementioned cycle may repeat on the generated objects with the help of refresh tokens and events generating new objects.

In some embodiments, generated objects may be directed to identifying infrastructure components required for processing the transaction. In such embodiments, refresh tokens associated with these generated objects, may be used for identifying individual infrastructure components that are not being used and are available to be allocated to a new application (e.g., a refresh token for an object associated with an infrastructure component may have a custom history table of refreshes that shows the infrastructure component has not been used in processing any transactions for a period of time (e.g., the application that used the infrastructure component was discontinued)).

What is more, the present invention provides a technical solution to a technical problem. As described herein, the technical problem includes identifying and reusing objects generated as a transaction is being processed. The technical solution presented herein allows for a system to receive a transaction, input the transaction into a transaction process flow, generate a plurality of objects, ingest the plurality of objects in a model, store a first subset of objects in one or more systems of record, and apply one or more objects of the first subset of objects to an associated transaction. In particular, providing reusable objects in a process flow via refresh tokens is an improvement over existing solutions to identifying and reusing objects generated as a transaction is being processed, (i) with fewer steps to achieve the solution, thus reducing the amount of computing resources, such as processing resources, storage resources, network resources, and/or the like, that are being used (e.g., by reusing objects that were previously generated, the creation of unwanted and/or new objects is limited when a similar and/or equivalent object available to use), (ii) providing a more accurate solution to the problem, thus reducing the number of resources required to remedy any errors made due to a less accurate solution (e.g., by using a model configured to analyze generated objects, previously generated objects may be pooled accurately and/or stored in a system of record accurately and/or may be accurately determined to be applicable to a subsequent transaction), (iii) removing manual input and waste from the implementation of the solution, thus improving speed and efficiency of the process and conserving computing resources (e.g., by storing rarely used and/or unused objects in systems of record and not focusing on said objects, manual input in error correction is reduced, saving time in transaction error correction), and (iv) determining an optimal amount of resources that need to be used to implement the solution, thus reducing network traffic and load on existing computing resources (e.g., by using a combination of refresh tokens and a model and/or models to analyze existing and/or generated objects, an optimal amount of objects are generated and remain available for reuse, reducing the amount of redundant objects generated and unnecessary objects remaining available in computing resources). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for providing reusable objects in a process flow via refresh tokens, in accordance with an embodiment of the invention. As shown in FIG. 1A, the distributed computing environment 100 contemplated herein may include a system 130 (i.e., a system for providing reusable objects in a process flow via refresh tokens), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. In some embodiments, the AI engine subsystem 200 may be included in a system (e.g., similar to the system 130 shown and described herein with respect to FIGS. 1A-1C). Additionally, or alternatively, the AI engine subsystem 200 may be a subsystem of another system (e.g., similar to the system 130 shown and described herein with respect to FIGS. 1A-1C) that is in communication with a system for providing reusable objects in a process flow via refresh tokens (e.g., via a network similar to the network 110 as shown and described herein with respect to FIGS. 1A-1C). The AI engine subsystem 200 may include a data acquisition engine 202, data ingestion engine 210, data pre-processing engine 216, AI tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so an artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the AI engine subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 240. In still other cases, artificial intelligence engines that perform regression techniques may use live data 234 to predict or forecast continuous outcomes.

It will be understood that the embodiment of the AI engine subsystem 200 illustrated in FIG. 2 is exemplary and that other embodiments may vary. As another example, in some embodiments, the AI engine subsystem 200 may include more, fewer, or different components.

FIG. 3 illustrates a flowchart 300 for providing reusable objects in a process flow via refresh tokens, in accordance with an embodiment of the disclosure. In some embodiments, a system (e.g., similar to one or more of the systems shown and described herein with respect to FIGS. 1A-1C) may perform one or more of the steps of flowchart 300. For example, a system for providing reusable objects in a process flow via refresh tokens (e.g., similar to the system 130 shown and described herein with respect to FIG. 1A-1C) may perform one or more of the steps of flowchart 300. In some embodiments, an artificial intelligence engine (e.g., similar to the AI engine subsystem 200 as shown and described herein with respect to FIG. 2) may perform one or more of the steps of flowchart 300.

In some embodiments, the flowchart 300 may begin with receiving a transaction from a system of origin, as shown in block 302. In such embodiments, once the incoming transaction has been received, the transaction may be input into a transaction process flow 304. The transaction process flow 304 may include a transaction step 1, a transaction step 2, and additional transaction steps up to a transaction step N as shown in FIG. 3, where N may be an integer number ranging from 1 to any number of transaction steps required to successfully process a transaction. In such embodiments, the number of transaction steps in the transaction process flow 304 may be determined by the type of transaction received from the system of origin 302. Further, a transaction step may be associated with processing done by a specific application. Additionally, or alternatively, at each transaction step in the transaction process flow 304, a plurality of objects necessary for processing the transaction at that transaction and/or for future transaction steps may be generated. As each plurality of objects is generated, each plurality of objects may, in some embodiments, be ingested by a model 308 for analysis and/or further processing. In some embodiments, when an object is required to process a transaction, instead of being generated, the model 308 may search one or more systems of record 316, an object pool for any transaction 322, and/or an object pool for specific transactions 324.

For example, for a transaction directed to a user engaging in a resource exchange with an entity, the system of origin 302 may be a front-end application (e.g., E-commerce platform, a mobile banking app, a point-of-sale system, and/or the like). The transaction received from the front-end application may be input into the transaction process flow 304, where inputting the transaction may include inputting objects generated by the system of origin 302 (e.g., user information, entity information, resource amount, resource type, resource exchange method, and/or the like). The transaction, after being input into the transaction process flow 304, may be received by transaction step 1 that may be associated with a resource exchange gateway application (e.g., payment gateway application). At this step in the transaction process flow 304, a plurality of objects may be generated and/or searched for in the one or more systems of record 316, the object pool for any transaction 322, and/or the object pool for specific transactions 324 (e.g., an object pool for resource exchange transactions) that are associated with the resource exchange gateway application (e.g., resource exchange request object, authorization object, session object, resource exchange gateway response object, and/or the like). After this plurality of objects is generated at this step, the plurality of objects may be passed to the model for further analysis, processing, and/or storage and/or passed to transaction step 2 in the transaction process flow 304 depending on the needs of processing the transaction. When processing is complete at this step in the transaction process flow 304, the necessary objects from the plurality of objects are sent to the transaction step 2 of the transaction process flow 304 which may be associated with a resource exchange processing application. During this step, a plurality of objects associated with the resource exchange processing application (e.g., resource exchange authorization object, resource exchange confirmation object, misappropriation detection object, resource exchange settlement object, and/or the like) may be generated and/or searched for. The process flow 304 will continue in this manner until all the required steps for processing the resource exchange transaction have been fulfilled and the transaction is completed.

In some embodiments, the flowchart 300 may include a transactional events monitor 306. In such embodiments, generated pluralities of objects may be transmitted at events to the model 308. The transactional events monitor 306 may be configured to monitor the status of the transaction and of the generated objects. Further, the transactional events monitor 306 may determine what system of record of the one or more systems of record 316 an object needs to be stored in and/or if an object should be transmitted to the reusable objects pools 322 and 324 for reuse in future transactions. Additionally, or alternatively, the transactional events monitor 306 may be configured to monitor objects in motion (e.g., objects currently being used by the transaction process flow 304) as shown in block 314.

In some embodiments, the model 308 may be configured to map the generated objects with the one or more systems of record 316 as shown in block 310 (e.g., similar to the steps of the process flow 500 as shown and described herein with respect to FIG. 5). In this way, the model may accurately locate and store objects in the one or more systems of record 316. Additionally, or alternatively, the model 308 may be configured to perform object segregation as shown in block 312 (e.g., similar to the steps of the process flow 600 as shown and described herein with respect to FIG. 6). In such embodiments, the model 308 may segregate the objects into user specific and/or transaction specific categories for temporal use. Further, the model 308 may assign refresh tokens to each object as described herein. After being segregated by the model 308, the objects not in use and/or determined to be of use in future transactions may be further split into a transaction/user agnostic category 318 (e.g., objects applicable to the majority of transactions) and/or a transaction/user specific category 320 (e.g., objects applicable only to specific users and/or transaction types). The segregated and/or split objects may then be placed into separate reusable objects pools such as an object pool for any transaction 322 and/or object pools for specific transactions and/or users 324. In this way, unused objects or objects determined to be used consistently by the model 308 may be kept available for future transactions. Finally, the refresh tokens assigned to objects in the reusable object pools 322 and 324 may be refreshed for subsequent transactions (e.g., have their refresh states set to reuse) as they are consumed and used by incoming transactions as shown in block 326.

The flowchart 300 may include additional embodiments, such as any single embodiment or any combination of embodiments described herein. Although FIG. 3 shows example blocks of the flowchart 300, in some embodiments, the flowchart 300 may include additional blocks, fewer blocks, different blocks, or differently arranged blocks than those depicted in FIG. 3. Additionally, or alternatively, two or more of the blocks of the flowchart 300 may be performed in parallel.

FIG. 4 illustrates a process flow 400 for providing reusable objects in a process flow via refresh tokens, in accordance with an embodiment of the invention. In some embodiments, a system (e.g., similar to one or more of the systems shown and described herein with respect to FIGS. 1A-1C) may perform one or more of the steps of process flow 400. For example, a system for providing reusable objects in a process flow via refresh tokens (e.g., similar to the system 130 shown and described herein with respect to FIG. 1A-1C) may perform one or more of the steps of process flow 400. In some embodiments, an artificial intelligence engine (e.g., similar to the AI engine subsystem 200 as shown and described herein with respect to FIG. 2) may perform one or more of the steps of process flow 400.

In some embodiments, and as shown in block 402, the process flow 400 may include the step of receiving, via a network interface, a transaction from a system of origin. In such embodiments, when the transaction is initiated in the system of origin, transaction data may be collected and transmitted by the system of origin via secure methods including APIs, message queues, direct database updates, and/or the like. Further, the transaction and/or the transaction data may be received for authentication and processing by a plurality of additional applications (e.g., resource gateway, resource processor, entity website, entity application, issuing entity, resource allocating device network, and/or the like). Additionally, in some embodiments, a response may be sent to the system of origin confirming receipt of the transaction and/or the transaction data.

In some embodiments, and as shown in block 404, the process flow 400 may include the step of inputting the transaction into a transaction process flow, where the transaction process flow includes N transaction steps. Upon receipt of the transaction from the system of origin, in order to authenticate and process the transaction, the transaction may be input into a transaction process flow (e.g., similar to the transaction process flow 304 as shown and described herein with respect to FIG. 3). In such embodiments, the transaction process flow may include one or more applications, each associated with a step of authenticating and processing the transaction. The transaction process flow may include N transactions steps (e.g., N different applications required to complete the transaction), where N may range from 1 to any number of steps necessary to complete the transaction. Additionally, or alternatively, the number of transactions steps in the transaction process flow may be determined by the transaction and/or the transaction data. For example, certain types of transactions (e.g., payment processing, account creation, vendor account creation, resource processing, resource transfer, and/or the like) may require the use of different applications and/or infrastructure components to fulfill the transaction.

In some embodiments, and as shown in block 406, the process flow 400 may include the step of generating, at each transaction step of the N transaction steps, a plurality of objects. In such embodiments, a transaction step may be associated with a specific application and/or infrastructure components require to complete the transaction. Further, the specific application and/or the infrastructure components may require certain objects to be generated and attached to the transaction in order to authenticate and/or process the transaction or for use in subsequent transaction steps (e.g., objects associated with payment details generated in a payment gateway step may be required to complete a transaction and may be required for use in a payment processing step). As such, at each transaction step of the transaction process flow, a plurality of objects may be generated as needed by an application associated with the transaction step.

Additionally, or alternatively, rather than generating an object for a plurality of objects for a transaction step, a model (e.g., similar to the model of the process flow 800 as shown and described herein with respect to FIG. 8 and/or the model 308 as shown and described herein with respect to FIG. 3) may be queried to search one or more systems of records (e.g., similar to the systems of record of block 410 of the process flow 400 as shown and described herein with respect to FIG. 4 and/or the systems of record 316 as shown and described herein with respect to FIG. 3) and/or reusable object pools (e.g., similar to the reusable object pools 322 and 324 as shown and described herein with respect to FIG. 3) for a similar and/or equivalent object. In such embodiments, if the model detects the object is stored in a system of record of the one or more systems of record or detects the object is stored in the reusable objects pools, the object may be retrieved instead of being generated an additional time.

In some embodiments, and as shown in block 408, the process flow 400 may include the step of ingesting, at each transaction step of the N transaction steps, the plurality of objects in a model. In such embodiments the model may be configured to map a generated object with a respective system of record (e.g., similar to the systems of record mapping 310 as shown and described herein with respect to FIG. 3 and/or the model of the process flow 500 as shown and described herein with respect to FIG. 5). Additionally, or alternatively, the model may be configured to analyze a generated object and associate a category with the generated object. Further, for generated objects that have an associated category, said objects may be segregated based on the assigned category by the model (e.g., similar to the object segregation 312 as shown and described herein with respect to FIG. 3 and/or the model of the process flow 600 as shown and described herein with respect to FIG. 6). As such, each plurality of objects generated by the transaction process flow may be ingested by the model and undergo one or more of the analyses and/or processing steps performed by the model as described herein.

In some embodiments, and as shown in block 410, the process flow 400 may include the step of storing, if the transaction reaches step N of the transaction process flow, a first subset of objects in one or more systems of record, where the first subset of objects includes objects from each plurality of objects. In such embodiments, if the transaction reaches step N of the transaction process flow, the transaction is successfully processed. Upon successful processing of the transaction, the first subset of objects (e.g., objects used during the transaction process flow) may be stored in the one or more systems of record, where a system of record may be dedicated to storing a specific object type and/or object category. In such embodiments, objects of the first subset of objects stored in one or more systems of record may be stored permanently and/or may be stored until the model determines that an object of the first subset of objects is needed for a subsequent transaction. Additionally, or alternatively, remaining objects not in the first subset of objects may be transmitted to the reusable object pools for use in a subsequent transaction that is similar to and/or related to the present transaction.

In some embodiments, if the transaction fails to reach step N of the transaction process flow, the transaction was interrupted and/or cancelled. In such embodiments, the transaction may have reached one or more steps of the transaction process flow and, as such, generated one or more pluralities of objects. Objects of the one or more pluralities of objects may be transmitted to the reusable object pools for use in a subsequent transaction that is equivalent to the failed transaction and/or similar to the failed transaction.

In some embodiments, and as shown in block 412, the process flow 400 may include the step of applying one or more objects of the first subset of objects to an associated transaction. In such embodiments, the associated transaction may be received and input into the transaction process flow for authentication and/or processing. Further, the model may determine (e.g., based on the associated transaction and/or associated transaction data) that the associated transaction is similar to the transaction. As such, the one or more objects of the first subset of objects may be required to complete the associated transaction. In such embodiments, rather than generating additional objects for the one or more objects that were previously generated and stored, the one or more objects may be applied to the associated transaction for facilitating fulfilment of the associated transaction while conserving computing resources. In some embodiments, objects located in the reusable object pools may be applied to the associated transaction.

The process flow 400 may include additional embodiments, such as any single embodiment or any combination of embodiments described herein. Although FIG. 4 shows example blocks of the process flow 400, in some embodiments, the process flow 400 may include additional blocks, fewer blocks, different blocks, or differently arranged blocks than those depicted in FIG. 4. Additionally, or alternatively, two or more of the blocks of the process flow 400 may be performed in parallel.

FIG. 5 illustrates a process flow 500 for providing reusable objects in a process flow via refresh tokens, in accordance with an embodiment of the invention. In some embodiments, a system (e.g., similar to one or more of the systems shown and described herein with respect to FIGS. 1A-1C) may perform one or more of the steps of process flow 500. For example, a system for providing reusable objects in a process flow via refresh tokens (e.g., similar to the system 130 shown and described herein with respect to FIG. 1A-1C) may perform one or more of the steps of process flow 500. In some embodiments, an artificial intelligence engine (e.g., similar to the AI engine subsystem 200 as shown and described herein with respect to FIG. 2) may perform one or more of the steps of process flow 500.

In some embodiments, and as shown in block 502, the process flow 500 may include the step of analyzing each object of a plurality of objects. In some embodiments, to analyze each object of the plurality of objects (e.g., similar to the plurality of objects generated in the process flow 400 as shown and described herein with respect to FIG. 4), a model (e.g., similar to the model 308 as shown and described herein with respect to FIG. 3) may first extract key features and/or attributes from each object of the plurality of objects (e.g., text, images, metadata, and/or the like). Further, the model may classify each object of the plurality of objects based on predefined categories and/or labels, identifying each object's type (e.g., invoice, contract, transaction, user account, vendor account, and/or the like). Additionally, or alternatively, the model may be configured to continuously improve by learning from feedback and refining its classification and matching processes. As will be appreciated by one of ordinary skill in the art in view of the present disclosure, the model may employ, may be generated by, and/or may be improved by any of the model techniques as described herein.

In some embodiments, and as shown in block 504, the process flow 500 may include the step of associating each object of the plurality of objects with a system of record of one or more systems of record. In some embodiments, a system of record may be a data system configured to store and/or manage objects generated during transactions, categorized by specific types and/or categories. In such embodiments, the system of record may ensure the generated objects are accurately recorded and linked to the correct categories. Additionally, or alternatively, the one or more systems of record may ensure object consistency and reliability, allowing other systems to access and use said objects for further processing, decision-making, and/or in transaction processing. In some embodiments, the model may use the classification of each object from the analysis to match each object to a correct system of record by comparing attributes of each object with existing data and/or objects. Further, the model may validate a match by checking for consistency and/or updating a system of record with the associated object, either linking it to an existing record or creating a new one. Additionally, or alternatively, the model learning from feedback may ensure that correct objects are associated with the correct systems of record over time, providing a reliable and automated way to manage and track objects within systems of record, ensuring accuracy and efficiency.

The process flow 500 may include additional embodiments, such as any single embodiment or any combination of embodiments described herein. Although FIG. 5 shows example blocks of the process flow 500, in some embodiments, the process flow 500 may include additional blocks, fewer blocks, different blocks, or differently arranged blocks than those depicted in FIG. 5. Additionally, or alternatively, two or more of the blocks of the process flow 500 may be performed in parallel. In some embodiments, the steps of the process flow 500 may be performed after and/or in conjunction with the step of block 404 of the process flow 400 as shown and described herein with respect to FIG. 4.

FIG. 6 illustrates a process flow 600 for providing reusable objects in a process flow via refresh tokens, in accordance with an embodiment of the invention. In some embodiments, a system (e.g., similar to one or more of the systems shown and described herein with respect to FIGS. 1A-1C) may perform one or more of the steps of process flow 600. For example, a system for providing reusable objects in a process flow via refresh tokens (e.g., similar to the system 130 shown and described herein with respect to FIG. 1A-1C) may perform one or more of the steps of process flow 600. In some embodiments, an artificial intelligence engine (e.g., similar to the AI engine subsystem 200 as shown and described herein with respect to FIG. 2) may perform one or more of the steps of process flow 600.

In some embodiments, and as shown in block 602, the process flow 600 may include the step of identifying, for each object of a plurality of objects, a category with which the object is associated. In some embodiments, to identify, for each object of the plurality of objects (e.g. similar to the plurality of objects generated in the process flow 400 as shown and described herein with respect to FIG. 4), a category (e.g., a user specific category, a transaction specific category, a transaction lifespan category, a miscellaneous category, and/or the like), a model (e.g., similar to the model 308 as shown and described herein with respect to FIG. 3 and/or similar to the model of the process flow 500 as shown and described herein with respect to FIG. 5) may analyze features for each object (e.g., keywords, metadata, structural elements, context, and/or the like). Further, the model may consider context in which the object is generated (e.g., which step of the transaction flow generated the object, the system of origin associated with the generated object, and/or the like) and/or may use any of the model techniques as described herein (e.g., machine learning) classify the object based on patterns and/or pre-labeled examples. Additionally, or alternatively, the model may apply heuristics and pattern matching to identify categories (e.g., such as recognizing terms like "address" for user accounts or "order ID" for transactions). In some embodiments, the model may assign a score, ensuring that objects are accurately categorized, and the model may adjust based on feedback or validation processes.

In some embodiments, and as shown in block 604, the process flow 600 may include the step of segregating each object of the plurality of objects, based on identified categories, into a user specific category or a transaction specific category. In some embodiments, once the model has identified the category each object of the plurality of objects is associated with, the model may segregate the objects by grouping them based on their category labels (e.g., user account, transaction-specific, and/or the like). In such embodiments, the model may tag each object with relevant metadata, store them in separate databases, directories, systems of record, and/or the like, and/or organize them within different tables in a data repository. Additionally, or alternatively, the model may be configured to filter and/or index the objects by category to optimize retrieval and management. This segregation ensures the objects are properly categorized and easily accessible for further processing, analysis, and/or use in the present transaction and/or future transactions.

In some embodiments, and as shown in block 606, the process flow 600 may include the step of assigning, for each object of the plurality of objects, a refresh token. In such embodiments, when assigning a refresh token to an object, the model may identify the correct object, validate and/or process the refresh token, and then integrate the refresh token into the object's attributes and/or state. Further, the model may perform consistency checks, log the change for auditing, and/or may learn to improve future assignments. In some embodiments, a refresh token may be configured to denote if an object is available for reuse or is not available for reuse (e.g., the refresh token has a refresh state of reuse or no reuse). Additionally, or alternatively, a refresh token may be configured to be reusable for subsequent transactions that share similarities with the present transaction. In some embodiments, the refresh token may include a refresh state (e.g., an attribute or property of a refresh token denoting if the refresh token is available for reuse in a future transaction or if the refresh token is not available for reuse in a future transaction), a current owner of the refresh token (e.g., what transaction is currently using the refresh token and the object the refresh token is assigned to), and/or a history table of owners of the refresh token (e.g., a table of transactions that have previously and/or is currently using the refresh token and the object the refresh token is assigned to).

In some embodiments, a refresh token that is assigned to an object that has been used in a completed transaction and/or set to be stored in a system of record may have a refresh state of no reuse. Additionally, or alternatively, if a transaction fails to complete, each refresh token assigned to each object generated during the failed transaction may have a refresh state of reuse.

The process flow 600 may include additional embodiments, such as any single embodiment or any combination of embodiments described herein. Although FIG. 6 shows example blocks of the process flow 600, in some embodiments, the process flow 600 may include additional blocks, fewer blocks, different blocks, or differently arranged blocks than those depicted in FIG. 6. Additionally, or alternatively, two or more of the blocks of the process flow 600 may be performed in parallel. In some embodiments, the steps of the process flow 600 may be performed after and/or in conjunction with the step of block 404 of the process flow 400 as shown and described herein with respect to FIG. 4.

FIG. 7 illustrates a process flow 700 for providing reusable objects in a process flow via refresh tokens, in accordance with an embodiment of the invention. In some embodiments, a system (e.g., similar to one or more of the systems shown and described herein with respect to FIGS. 1A-1C) may perform one or more of the steps of process flow 700. For example, a system for providing reusable objects in a process flow via refresh tokens (e.g., similar to the system 130 shown and described herein with respect to FIG. 1A-1C) may perform one or more of the steps of process flow 700. In some embodiments, an artificial intelligence engine (e.g., similar to the AI engine subsystem 200 as shown and described herein with respect to FIG. 2) may perform one or more of the steps of process flow 700.

In some embodiments, and as shown in block 702, the process flow 700 may include the step of identifying a second subset of objects used in a plurality of transactions. In some embodiments, to identify, a second subset of objects (e.g. similar to the objects generated in the process flow 400 as shown and described herein with respect to FIG. 4), a model (e.g., similar to the model 308 as shown and described herein with respect to FIG. 3, similar to the model of the process flow 500 as shown and described herein with respect to FIG. 5, and/or similar to the model of the process flow 600 as shown and described herein with respect to FIG. 6) may analyze features of each object (e.g., keywords, metadata, structural elements, context, and/or the like) to determine if the object has been used in a plurality of transactions. Further, each object may have a refresh token (e.g., similar to the refresh tokens of the process flow 600 as shown and described herein with respect to FIG. 6) assigned to it, and the model may analyze the refresh token to determine if the object has been used in a plurality of transactions and, as such, should be placed in the second subset of objects. For example, the model may analyze a history table of owners associated with a refresh token of an object. The model may then determine, based on the history table, that the object is used consistently to process various transactions. Based on this determination, the model may then identify that the object should be placed in the second subset of objects.

In some embodiments, and as shown in block 704, the process flow 700 may include the step of setting a refresh state of a refresh token assigned to an object of the second subset of objects to reuse. In such embodiments, if an object has been identified to have been used in a plurality of transactions, the refresh state of each refresh token may be set to reuse. In this way, objects consistently used in various transactions may be readily available for reuse in future transactions. Additionally, or alternatively, objects in the second subset of objects may be stored in a reusable object pool (e.g., similar to the reusable object pools 322 and 324 as shown and described herein with respect to FIG. 3). Additionally, or alternatively, objects in the second subset of objects may be stored in one or more systems of record.

The process flow 700 may include additional embodiments, such as any single embodiment or any combination of embodiments described herein. Although FIG. 7 shows example blocks of the process flow 700, in some embodiments, the process flow 700 may include additional blocks, fewer blocks, different blocks, or differently arranged blocks than those depicted in FIG. 7. Additionally, or alternatively, two or more of the blocks of the process flow 700 may be performed in parallel.

FIG. 8 illustrates a process flow 800 for providing reusable objects in a process flow via refresh tokens, in accordance with an embodiment of the invention. In some embodiments, a system (e.g., similar to one or more of the systems shown and described herein with respect to FIGS. 1A-1C) may perform one or more of the steps of process flow 800. For example, a system for providing reusable objects in a process flow via refresh tokens (e.g., similar to the system 130 shown and described herein with respect to FIG. 1A-1C) may perform one or more of the steps of process flow 800. In some embodiments, an artificial intelligence engine (e.g., similar to the AI engine subsystem 200 as shown and described herein with respect to FIG. 2) may perform one or more of the steps of process flow 800.

In some embodiments, and as shown in block 802, the process flow 800 may include the step of querying a model to search one or more systems of records for an object. In such embodiments, the model may interpret the query to understand the intent and extract key details (e.g., dates, filters, object type, object category, transaction details, user details, and/or the like) regarding the object being searched for. Further, the model may generate a corresponding system of record query based on the interpreted input. Additionally, or alternatively, the query may be sent to the one or more systems of record that may be configured to process the query and retrieve a matching object if a match is found. In some embodiments, the retrieved object may be similar to or equivalent to the object being searched for.

In some embodiments, and as shown in block 804, the process flow 800 may include the step of retrieving, if the model detects the object is stored in a system of record of the one or more systems of record, the object. In such embodiments, the detected objects may be similar enough (e.g., the model determines it reaches a threshold of equivalence) or may be equivalent to the searched for object. Further, upon retrieval the object may be transmitted for use in a transaction process flow (e.g., similar to the transaction process flow of the process flow 400 as shown and described herein with respect to FIG. 4). In some embodiments, retrieval of the object may prevent generation of the object. Additionally, or alternatively, the retrieved object may have an assigned refresh token with a refresh state of reuse. In some embodiments, the model may be further configured to search a reusable pool of objects (e.g., similar to the reusable pool of objects 322 and 324 as shown and described herein with respect to FIG. 3) for the object being searched for.

The process flow 800 may include additional embodiments, such as any single embodiment or any combination of embodiments described herein. Although FIG. 8 shows example blocks of the process flow 800, in some embodiments, the process flow 800 may include additional blocks, fewer blocks, different blocks, or differently arranged blocks than those depicted in FIG. 8. Additionally, or alternatively, two or more of the blocks of the process flow 800 may be performed in parallel. In some embodiments, the steps of the process flow 800 may be performed prior to and/or in conjunction with the step of block 406 of the process flow 400 as shown and described herein with respect to FIG. 4.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in party to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing reusable objects in a process flow via refresh tokens, the system comprising:

a network interface configured to communicate via a communication network;

at least one non-transitory storage device comprising computer-executable program code stored thereon; and at least one processing device operably coupled to the network interface and the at least one non-transitory storage device, wherein the computer-executable program code comprises computer instructions that, when executed by the at least one processing device, cause the at least one processing device to:

receive, via the network interface, a transaction from a system of origin;

input the transaction into a transaction process flow, wherein the transaction process flow comprises N transaction steps;

generate, at each transaction step of the N transaction steps, a plurality of objects;

ingest, at each transaction step of the N transaction steps, the plurality of objects in a model;

assign, using the model and for each object of the plurality of objects, a refresh token of refresh tokens, wherein the refresh tokens are configured to be reusable for other transactions associated with the transaction, and wherein each refresh token comprises a refresh state, a current owner of the refresh token, and a history table of owners of the refresh token;

store, in response to the transaction reaching step N of the transaction process flow, a first subset of objects in one or more systems of record, wherein the first subset of objects comprises objects from each plurality of objects;

apply one or more objects of the first subset of objects to an associated transaction;

analyze a history table of owners for a refresh token of each object of a second plurality of objects;

determine, based on the history tables of owners, that a second subset of objects of the second plurality of objects are used in a plurality of transactions; and set a refresh state of each refresh token assigned to each object of the second subset of objects to reuse.

2. The system of claim 1, wherein the at least one non-transitory storage device comprises computer-executable program code that, when executed by the at least one processing device, causes the model to, after ingesting the plurality of objects at a transaction step:

analyze each object of the plurality of objects; and associate each object of the plurality of objects with a system of record of the one or more systems of record.

3. The system of claim 1, wherein the at least one non-transitory storage device comprises computer-executable program code that, when executed by the at least one processing device, causes the model to, after ingesting the plurality of objects at a transaction step:

identify, for each object of the plurality of objects, a category with which the object is associated; and segregate each object of the plurality of objects, based on identified categories, into a user specific category or a transaction specific category.

4. The system of claim 3, wherein the model is configured to track, via the transaction process flow, a life cycle of the transaction, the N transaction steps involved in the transaction, and a user account associated with the transaction.

5. The system of claim 3, wherein a refresh token assigned to an object of the first subset of objects has a refresh state of no reuse.

6. The system of claim 3, wherein, in response to the transaction failing to reach step N of the transaction process flow, each refresh token assigned to each object of each plurality of objects has a refresh state of reuse.

7. The system of claim 1, wherein one or more objects of at least one plurality of objects are associated with infrastructure components used in the transaction process flow.

8. The system of claim 1, wherein the at least one non-transitory storage device comprises computer-executable program code that, when executed by the at least one processing device, causes the at least one processing device to, prior to generating an object of the plurality of objects at each transaction step:

query the model to search the one or more systems of record for the object; and retrieve, in response to the model detecting the object is stored in a system of record of the one or more systems of record, the object.

9. A computer program product for providing reusable objects in a process flow via refresh tokens, the computer program product comprising a non-transitory computer-readable medium comprising code causing an apparatus to:

receive, via a network interface, a transaction from a system of origin;

input the transaction into a transaction process flow, wherein the transaction process flow comprises N transaction steps;

generate, at each transaction step of the N transaction steps, a plurality of objects;

ingest, at each transaction step of the N transaction steps, the plurality of objects in a model;

assign, using the model and for each object of the plurality of objects, a refresh token of refresh tokens, wherein the refresh tokens are configured to be reusable for other transactions associated with the transaction, and wherein each refresh token comprises a refresh state, a current owner of the refresh token, and a history table of owners of the refresh token;

store, in response to the transaction reaching step N of the transaction process flow, a first subset of objects in one or more systems of record, wherein the first subset of objects comprises objects from each plurality of objects;

apply one or more objects of the first subset of objects to an associated transaction;

analyze a history table of owners for a refresh token of each object of a second plurality of objects;

determine, based on the history tables of owners, that a second subset of objects of the second plurality of objects are used in a plurality of transactions; and set a refresh state of each refresh token assigned to each object of the second subset of objects to reuse.

10. The computer program product of claim 9, wherein the non-transitory computer-readable medium comprises code causing the model to, after ingesting the plurality of objects at a transaction step:

analyze each object of the plurality of objects; and associate each object of the plurality of objects with a system of record of the one or more systems of record.

11. The computer program product of claim 9, wherein the non-transitory computer-readable medium comprises code causing the model to, after ingesting the plurality of objects at a transaction step:

identify, for each object of the plurality of objects, a category with which the object is associated; and segregate each object of the plurality of objects, based on identified categories, into a user specific category or a transaction specific category.

12. The computer program product of claim 11, wherein a refresh token assigned to an object of the first subset of objects has a refresh state of no reuse.

13. The computer program product of claim 11, wherein, in response to the transaction failing to reach step N of the transaction process flow, each refresh token assigned to each object of each plurality of objects has a refresh state of reuse.

14. The computer program product of claim 9, wherein one or more objects of at least one plurality of objects are associated with infrastructure components used in the transaction process flow.

15. The computer program product of claim 9, wherein the non-transitory computer-readable medium comprises code causing the model to, prior to generating an object of the plurality of objects at each transaction step:

query the model to search the one or more systems of record for the object; and retrieve, in response to the model detecting the object is stored in a system of record of the one or more systems of record, the object.

16. A computer-implemented method for providing reusable objects in a process flow via refresh tokens, the method comprising:

receiving, via a network interface, a transaction from a system of origin;

inputting the transaction into a transaction process flow, wherein the transaction process flow comprises N transaction steps;

generating, at each transaction step of the N transaction steps, a plurality of objects;

ingesting, at each transaction step of the N transaction steps, the plurality of objects in a model;

assigning, using the model and for each object of the plurality of objects, a refresh token of refresh tokens, wherein the refresh tokens are configured to be reusable for other transactions associated with the transaction, and wherein each refresh token comprises a refresh state, a current owner of the refresh token, and a history table of owners of the refresh token;

storing, in response to the transaction reaching step N of the transaction process flow, a first subset of objects in one or more systems of record, wherein the first subset of objects comprises objects from each plurality of objects;

applying one or more objects of the first subset of objects to an associated transaction;

analyzing a history table of owners for a refresh token of each object of a second plurality of objects;

determining, based on the history tables of owners, that a second subset of objects of the second plurality of objects are used in a plurality of transactions; and setting a refresh state of each refresh token assigned to each object of the second subset of objects to reuse.

17. The method of claim 16 further comprising, after ingesting the plurality of objects at a transaction step:

analyzing each object of the plurality of objects; and associating each object of the plurality of objects with a system of record of the one or more systems of record.

18. The method of claim 16 further comprising, after ingesting the plurality of objects at a transaction step:

identifying, for each object of the plurality of objects, a category with which the object is associated; and segregating each object of the plurality of objects, based on identified categories, into a user specific category or a transaction specific category.

19. The method of claim 18, wherein the model is configured to track, via the transaction process flow, a life cycle of the transaction, the N transaction steps involved in the transaction, and a user account associated with the transaction.

20. The method of claim 18, wherein a refresh token assigned to an object of the first subset of objects has a refresh state of no reuse.

* * * * *